United States Patent [19]

Laird

[11] 4,013,062

[45] Mar. 22, 1977

[54] SOLAR HEAT ABSORBER

[76] Inventor: Gary W. Laird, P.O. Box 9013, 3231 Trout River Blvd., Jacksonville, Fla. 32208

[22] Filed: Aug. 20, 1975

[21] Appl. No.: 606,188

[52] U.S. Cl. .............................. 126/271; 165/171
[51] Int. Cl.² ........................................ F24J 3/02
[58] Field of Search ............ 126/270, 271; 237/1 A; 165/171; 60/641

[56] References Cited

UNITED STATES PATENTS

| | | | |
|---|---|---|---|
| 1,338,644 | 4/1920 | Arthur et al. | 126/271 |
| 2,208,789 | 7/1940 | Cally | 126/271 |
| 3,822,692 | 7/1974 | Demarest | 126/271 |
| 3,902,474 | 9/1975 | Pyle | 126/271 |
| 3,919,998 | 11/1975 | Parker | 126/271 |

Primary Examiner—Kenneth W. Sprague
Assistant Examiner—James C. Yeung

Attorney, Agent, or Firm—George H. Baldwin; Arthur G. Yeager

[57] ABSTRACT

The solar heat absorber includes a frame and a plurality of clear panels respectively overlying a plurality of arcuate shaped heat collecting plates supported by the frame and compartmented each from the next by separators forming dead air spaces or cells. At least one continuous fluid passage tube is soldered to each plate and provides a cool tube inlet and a feedback hot tube outlet section for each plate whereby some of the heat in the hot tube section is transferred through the cell to its cool tube section within each cell prior to discharge of the fluid out the hot tube section. Each of the cells is at a temperature different than the temperature of an adjacent cell and a heat sink is provided in contact with each panel to substantially equalize the temperature of the panels.

30 Claims, 13 Drawing Figures

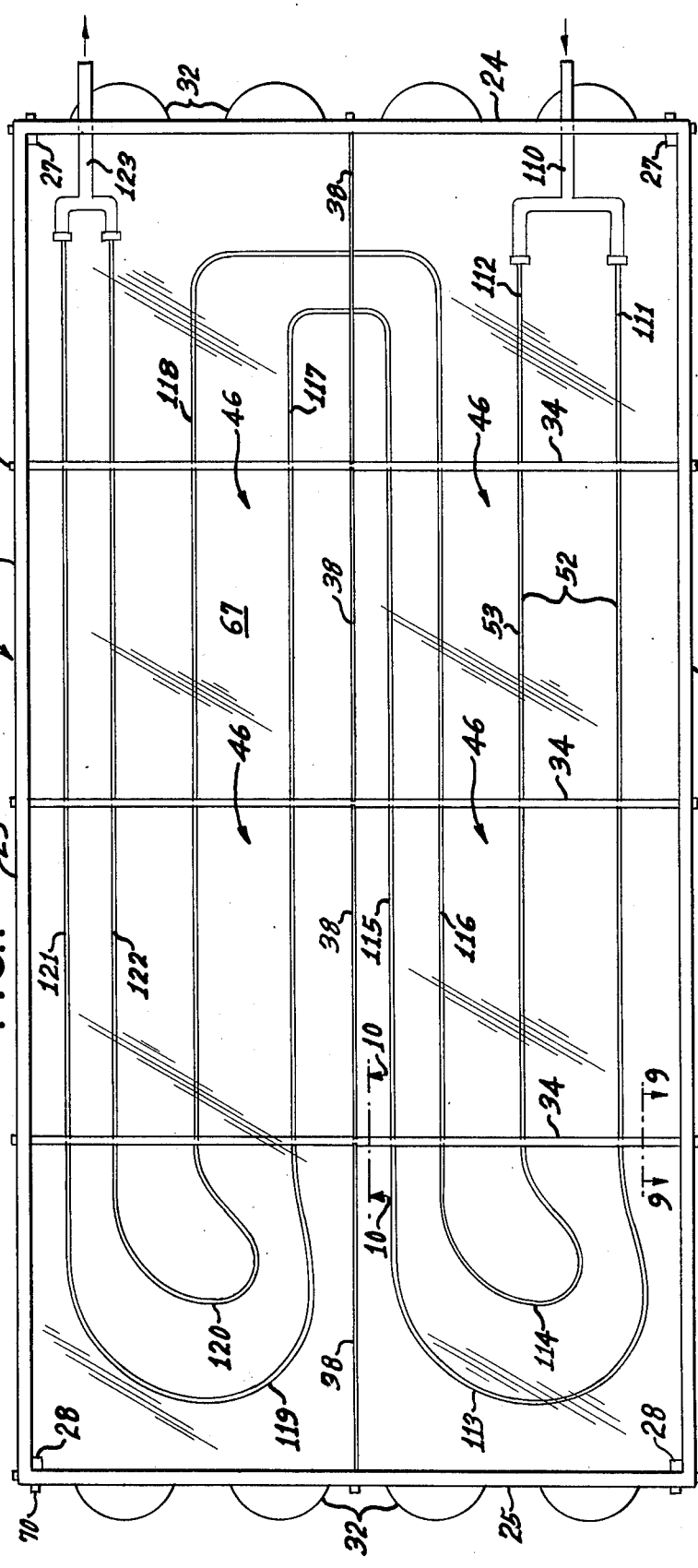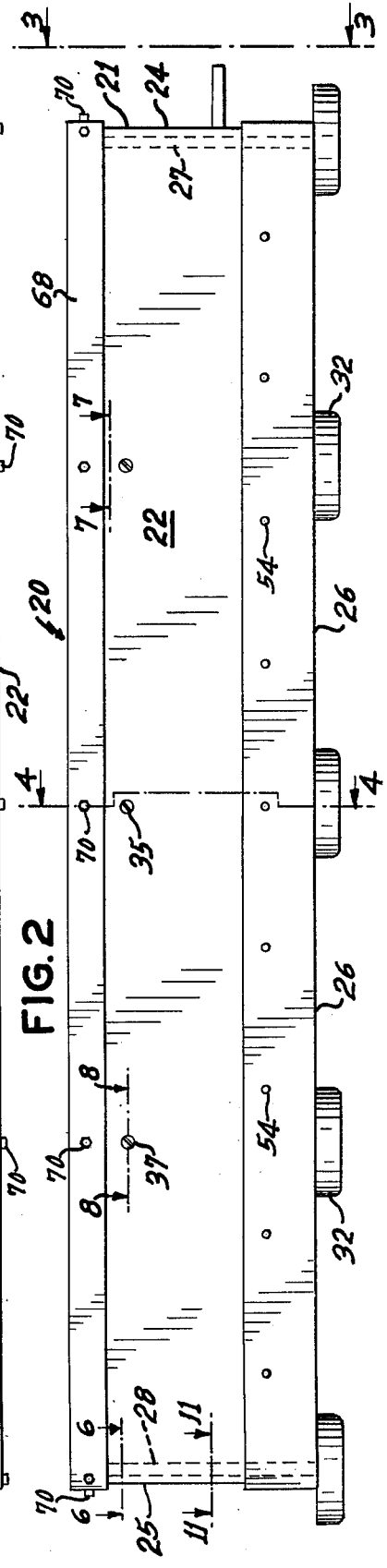

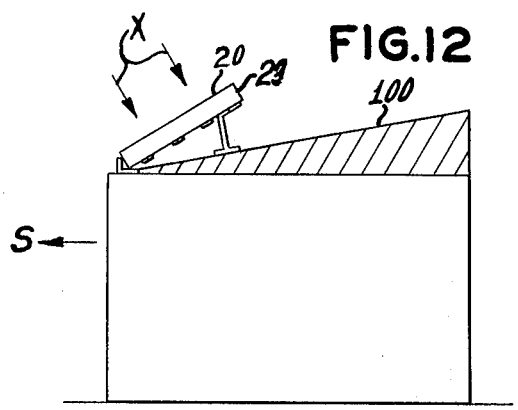
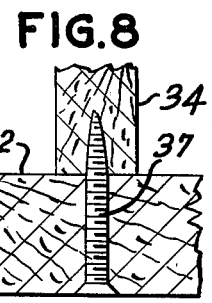
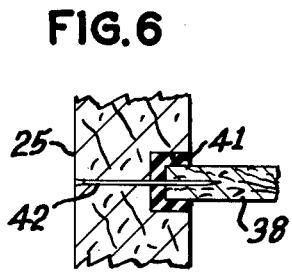
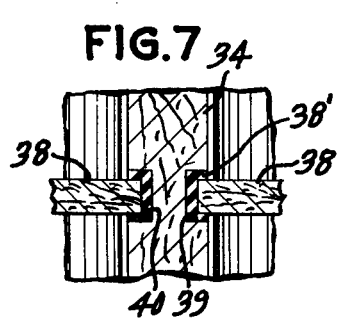
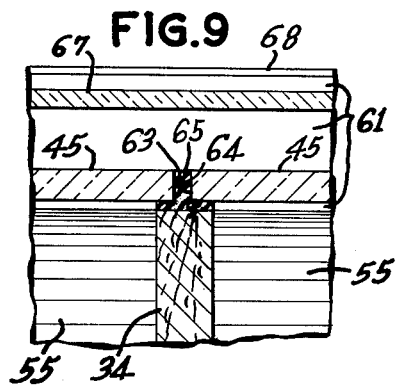
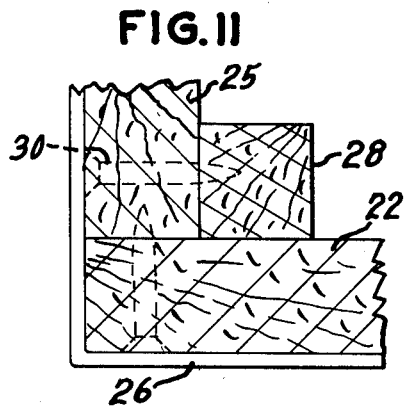
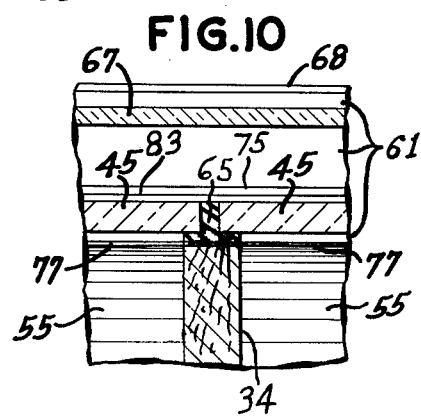
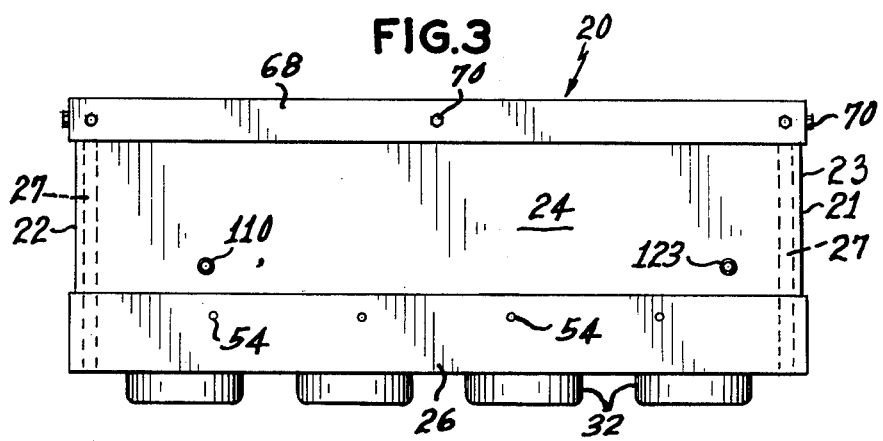

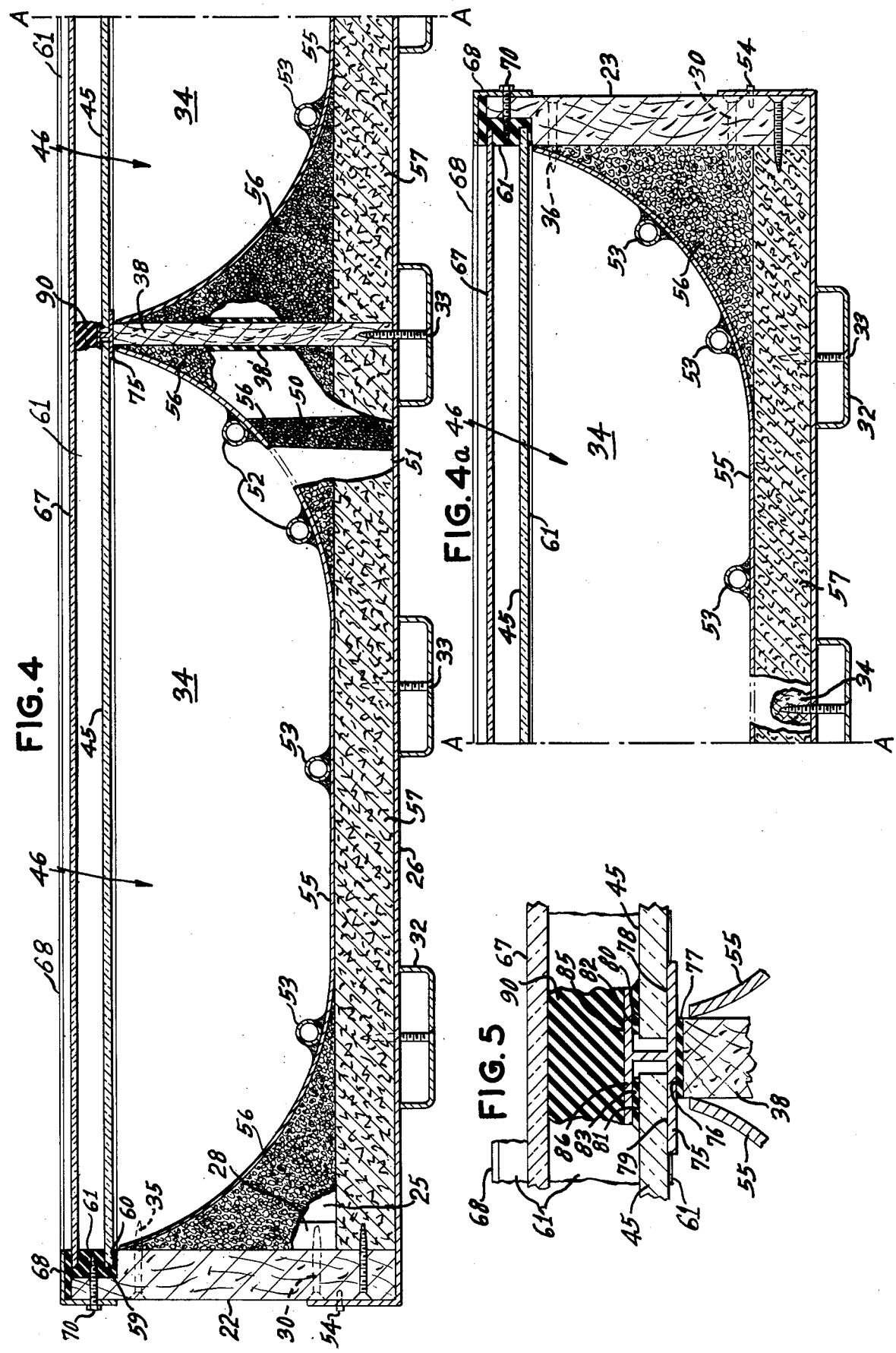

SOLAR HEAT ABSORBER

BACKGROUND OF THE INVENTION

1. Field of the Invention

This invention relates to solar heat absorbers or collectors and more particularly to improved solar heat collectors for the heating of fluids such as water.

2. Description of the Prior Art

The art of solar collectors is well known. Also, there are several publications relating to solar collectors including "Now You Can Buy Solar Heating Equipment For Your Home", *Popular Science*, March 1975, Vol. 206, No. 3, pp 74–77, 136, 138–140, 142; "Energy from the sun: three new developments", *Popular Science* May 1975, Vol. 206, No. 5, described hereinafter as the Tungstun spike method; and "Magic Box Lets Sun Shine In", *Washington Star News*, December 1974; described hereinafter as the Gaydos compound method.

For many years there have been many unresolved conflicts among those skilled in the art of solar heat collection. Infrared energy has been treated both as electromagnetic wave energy and as bursts of energy within certain photon levels of atoms. It is known that atoms absorb certain amounts of energy in differing rates and release energy at the same rate or at different rates. It is not, however, understood how or why this occurs either directly or physically. Many experiments have resulted in hundreds of facts relating to the atomic structures of various elements when excited by infrared energy and their ability to absorb and release this energy. With this increase of knowledge the newest solar heat technology is finding better ways of collecting, exchanging and utilizing solar heat.

Some of the prior art, illustrated in the Popular Science article above, relates to the flat rooftop solar heat collectors, which normally includes a blackened copper or aluminum sheet to which a number of hollow tubes are attached. The collector is covered by a plate of transparent plastic or glass. When exposed to sunlight, the black metal sheet absorbs the solar heat and transfers it to fluid passing through the hollow tubes. The warm air or water within the tubes is then circulated throughout the house for heating same or it may be used or stored in hot water insulated tanks. The transparent plate of the solar collector allows the infrared radiation of the sun to pass through and heat the metal sheet, but at the same time the plate traps the infrared radiation that is given off by the metal and the heat is removed therefrom by the liquid passing through the tubes.

A proper design of an absorber requires a material which absorbs heat fast and has the ability to release it in desired amounts when needed. The basic prior art design of flat box absorbers was based on the concept of absorbing and removing heat as fast as possible, because the aluminum or copper atom absorbs and conducts or radiates at approximately the same rate.

Copper has one of the best absorption and conduction qualities for solar heat collectors of any substance within practical economics, but the operational technique of fast pumping causes much of the energy gained from the sun to be lost and the energy required to pump at a fast rate to be wasted. Also, the problem of high heat losses at higher temperatures necessary for turbine electrical generation and/or air conditioning systems compounds such losses.

The prior art has attempted to overcome these solar heating problems in the following manner:

A. Gaydos compound method: by increasing the specific heat without substantial loss of the absorbing quality, Gaydos developed a mixture of substances with the consistency of tar to employ as a solar absorber. This material apparently retains the solar heat collected while a slower pumping rate of the water through the tubes embedded therein removes the heat absorbed by such material. This method has certain apparent shortcomings including the fact that the collector must function at lower temperatures and there is a decrease in the absorption capabilities.

B. Tungsten spike method: Apparently stores the heat at very high temperatures without substantial radiation loses, but the cost of material and production costs would prevent any wide commercialization of this method.

A flatbox collector of the prior art with curving tubes in a dead air space provides less heat collected as the mean temperature of the water heated is increased.

Thus, the efficiency of absoprtion drops off as the mean temperature of the water increases. This is due to losses of radiation from the absorbing surface to the collector enclosure and to the surrounding air about the collector. Increasing insulation and adding double plates of glass on the collector generally increase efficiency at higher temperatures of operation of the prior art.

Higher mean temperature of heated water is mandatory for operation of air conditioning equipment, yet for maximum heat collected lower operational temperatures are necessary. The problem then is to overcome heat losses by two method: larger storage and/or more collector surface. Larger storage allows for larger heat collected and extremely fast pumping is necessary to keep the collector at maximum efficiency. Large areas of collection or a greater number of collectors are also necessary to absorb enough heat to permit the use thereof in air conditioning systems.

Availability of solar energy is known to be directly related to local climate. The general estimate of solar energy hitting a collector surface in full direct sunlight is approximately 350 BUT hr/ft$^2$. An efficiency rating for solar equipment must take into account not only the heat collected but how much energy was required to obtain the energy, electrical pumps, fans, etc. Efficiency of the heat collected must then be considered in view of total energy necessary to operate the solar energy collection system.

The patents to Wheeler U.S. Pat. No. 1,873,854 and 1,971,242 disclose solar collector systems in which water in a storage tank is recirculated back through additional tubing in the collector and heat is transferred from the hot coil to the recirculating coil so that the collector continues to heat and store water regardless of whether the water is being used. The invention disclosed herein is directed to a collector in which hotter fluid is recirculated within the collector, prior to leaving the collector whereby some of the heat is fed back from the hotter tube into the cooler tube and the fluid passing therethrough, and this increases the amount of heat or temperature of the water being discharged from the collector.

It is believed that energy carried along wavelengths can best be absorbed in phase relationship. The heat of the fluid in the hotter tube section may be transmitted to and absorbed by the fluid in the cooler tube section when the infra red energy being received by the cooler tube section is at a minimum at that location. Thus, this invention is based on the concept that heat is fed back from the hotter tube section into a cell or chamber which contains a cooler tube section and some of the heat from the hotter tube section is transferred into he cooler tube section and provides an ultimate hotter output from the collector. The collector herein disclosed employs tubing located and passing through a plurality of cells or dead air spaces to provide hotter and cooler tube sections for conducting both a hotter fluid and a cooler fluid respectively therethrough whereby heat is recirculated or transferred from the hotter tube section into the cooler tube section prior to leaving the collector.

SUMMARY OF THE INVENTION

In accord with the present invention the solar heat absorber or collector includes an enclosure, a clear cover overlying same with a plurality of heat collecting metal plates supported by the enclosure beneath the cover. Fluid passage means are attached to the plates for removing the heat collected by the plates and compartmental means subdivide the absorber and provide separation between the plates and provide a plurality of cells or dead air spaces between the plates and cover. The fluid passage means includes an inlet tube section communicating with a fluid inlet outwardly of one of the dead air spaces and passing through the one dead air space into another of the dead air spaces adjacent to the one dead air space. An outlet tube section passes from the adjacent dead air space into the one dead air space and communicates outwardly of the dead air space. A bent tube section couples the inlet tube section and the outlet tube section in the adjacent dead air space whereby hotter fluid which passes between the inlet and outlet is fed back into the one dead air space for transference of some of the heat thereof into the one dead air space and thence into the cooler fluid within the inlet tube section within the one dead air space.

Thus, in accord with this invention the collector has a plurality of individual cells which are arranged in parallel and generally horizontal rows, such cells absorbing the solar heat and the fluid medium passing from the collector input sequentially through the cells is reintroduced by feedback looping through the cells prior to utilization of the heated medium from the output of the collector. By "feedback looping" it is intended that a hotter fluid medium is later reintroduced with a cell through which the cooler fluid medium had already passed. The theory of operation is based on quantum mechanics of absorption and reabsorption in a phase relationship to the wavelength of infrared energy, i.e. infrared energy carried along wavelengths are best absorbed in a phase relationship, or a time constant of absorption rate flow or the reintroduction of heat in phase.

Other details of this invention relate to a plurality of transparent panels respectively overlying the heat absorbing plates; a heat sink means contacting each of the panels to substantially equalize the various temperatures thereof; a transparent cover panel spaced from and overlying all of the panels; the plates are formed in an arcuate shape with respect to the vertical direction whereby the solar energy absorbing surface is enlarged and provides greater tracking thereof without repositioning of the collector; and with the conduit means passing through all of the cells or dead air spaces is a continuous tube suitably connected throughout its length to the absorbing plates except in the locations of the separators which compartmentalize the absorber into a plurality of cells.

A general object of this invention is to provide an improved solar energy absorber or collector.

Another general object is the provision of a collector with high efficiency, but economical in construction and use.

A further object is to increase the temperature of the fluid medium passing through the improved collector without the amount of losses normally encountered in the flat box collectors of the prior art.

A specific object is to reduce glass breakage in solar collectors and provide an improved collector which uses less expensive glass.

Another specific object is to reduce the energy consumed by solar collectors.

An additional specific object is the provision of an improved solar collector which is less subject to wide variations of solar paths and which requires no repositioning between winter and summer months.

Other objects include an improved solar collector which is economical in construction and use, durable and efficient in its operation, and requires a minimum of care and maintenance.

BRIEF DESCRIPTION OF THE DRAWINGS

The novel features which are believed to be characteristic of this invention are set forth with particularlity if the appended claims. The invention itself, however, both as to its organization and method of operation, together with further objects and advantages thereof, may best be understood by reference to the following description taken in connection with the accompanying drawings, in which:

FIG. 1 is a top plan view of the solar heat collector in accord with the invention, with heat sink and adhesive removed;

FIG. 2 is a side elevational view thereof;

FIG. 3 is an end elevational view taken along line 3—3 of FIG. 2;

FIG. 4 and 4a are an enlarged cross sectional view taken along line 4—4 of FIG. 2;

FIGS. 4 and 4a are connectable along line A—A;

FIG. 5 is an enlarged view of the upper central portion of the collector shown in FIG. 4;

FIG. 6 is an enlarged cross-sectional view taken along line 6—6 of FIG. 2;

FIG. 7 is an enlarged cross-sectional view taken along line 7—7 of FIG. 2;

FIG. 8 is an enlarged cross-sectional view taken along line 8—8 of FIG. 2;

FIG. 9 is an enlarged cross-sectional view taken along line 9—9 of FIG. 1;

FIG. 10 is an enlarged cross-sectional view taken along line 10—10 of FIG. 1;

FIG. 11 is an enlarged cross-sectional view taken along line 11—11 of FIG. 2; and FIG. 12 is a reduced end view of the collector in accord with this invention positioned on a roof.

DESCRIPTION OF THE PREFERRED EMBODIMENT

Referring now more particularly to the drawings of FIGS. 1 – 4, the collector in accord with the invention is generally designated by numeral 20 and includes an enclosure or closed box frame 21 formed by two wood side walls 22 and 23, two wood end walls 24 and 25 and a formed metal pan bottom 26, with pairs of wood corner posts 27 and 28, suitably attached by adhesive and screws, including screw 30, to the side walls and end walls, as illustrated in FIG. 11. A plurality of foot members 32 are spacedly mounted by screws 33 throughout the bottom 26 for supporting the collector 20 on a roof, as hereinafter more fully described.

Compartmental or separation means in the form of transverse wood members 34 extend parallel to the end walls 24 and 25 and are connected by adhesive and screws, including screws 35, 36 and 37, to side walls 22 and 23 in the manner shown in FIG. 8. The separation means includes longitudinal wood members 38 glued by silicon rubber glue 38' or the like within vertical grooves 39 and 40 in members 34, as shown in FIG. 7. Longitudinal members 38 adjacent the end walls 24 and 25 are also glued within vertical grooves, including groove 41, by a plurality of elongated pins, including pin 42, as depicted in FIG. 6. Each of the transverse and longitudinal members 34 and 38 extend to the bottom 26, and the screws 33 securing the foot members 32 extend through the bottom 26 and into members 34 and 38, as clearly seen in FIG. 4, and terminate substantially adjacent the glass cover 45, cover 45 comprising a plurality of glass panels overlying respective dead air spaces or cells 46.

Each of the wood members 34 is provided with a plurality of slots, including slot 50, which extend from edges, including edge 51, and terminate in predetermined locations upwardly therefrom through which the fluid passage means 52, in the form of copper tubing 53, extends, as clearly shown in FIG. 4. Prior to attaching the bottom 26 to the wood side and end walls 22, 23 and 24, 25 by rivets 54 the tubing 53, is passed through the slots, including slot 50, and is passed into the upper ends of the slots which retain the tubing 53 in the proper location illustrated in FIG. 4. The arcuate copper plates 55 are then positioned in contact with the tubing 53 and soldered thereto in a manner obvious to a skilled person in the art. Thereafter, soft loose fiberglass insulation 56 is closely packed under absorbing plates 55 and into the slots, including slot 50. Hard pressed fiberglass insulation panesl 57 are respectively postioned beneath each of the copper plates 55 within respective spaces or cells 46 and then the bottom 26 is attached, foot members 32 are connected by screws 33 which extend through bottom 26 and terminate in respective wood members 34 and 38 thereby completing the assembly of the bottom portion of the collector 20.

Each glass panel 45 is supported along edge 59 by a ledge 60 of side wall 22, or side wall 23, and sealed thereto by silicone rubber adhesive 61, as seen in FIGS. 4 and 9. The edges 63 and 64 of adjacent glass panels 45 are supported by one of the separators 34 and sealed thereto by silicon rubber adhesive 65, as illustrated in FIG. 9. Sealed within adhesive 61 is an elongated single cover plate 67 of Plexiglass or the like transparent material which overlies all of the glass panels 45 and provides a protective shield therefor as well as additional insulation for the collector 20 to retain the infra red energy within the collector 20 by reducing re-radiation losses. L-shaped caps 68 are also positioned along the side and end walls 22, 23 and 24, 25 and are sealed thereto by adhesive 61 to provide protection to the collector 20 from the weather elements. A plurality of screws 70 affix caps 68 to respective side and end walls 22, 23 and 24, 25.

Heat sink means, in the form of an I-shaped extrusion 75, is attached along the upper surfaces 76 of longitudinal separator members 38, and the intersection of cross members 34, by adhesive 77. Within each of the channels 78 and 79 is disposed glass edge portions 80 and 81 which are sealed therein by silicone rubber adhesive 82 and 83 between the upper flanges 85, 86 and respective transparent glass panels 45. An insulative spacer 90 formed of a mound of silicone rubber or any other suitable material supports and affixes the uppermost transparent cover plate 67 to extrusion 75 spacedly above and overlying all of the glass panels 45, cover plate 67 being of a clear plastic, like Plexiglass, glass or any other appropriate clear or transparent material.

The heat sink means provides a certain amount of surface temperature equalization between the various glass panels 45 and tends to reduce the occurrence of hot spots and cold spots. Furthermore the breaking tendency of the glass panels 45 is minimized by the inclusion of the uppermost Plexiglass plate 67, which physically shields the panels and provides dead air spaces between plate 67 and panels 45. Without plate 67 and heat sink 75, snow or ice on the hottest of the cells 46 would cause the glass panel 45 to break. Also, the more even expansion and contraction of the various glass panels 45 tend to become equalized by the heat sink and such expansion and contraction of smaller glass panels results in a reduction of the internal stresses within the glass. Since certain areas of the prior art single glass cover may reach substantially higher temperatures than other areas, more expensive stress resistant glass would be required if a single glass cover were used.

Due to the operation of the solar absorber 20 in reintroducing a hotter fluid back into a cooler cell in accord with this invention, the glass panels 45 that are hotter will cause the heat sink 75 to transmit heat to the cooler glass panels 45 thereby tending to raise the temperature of the cooler cell and some of the heat thereof, i.e., some very small amount, may be reabsorbed by the cooler or hotter tube sections within such cooler cell. In the event that the cover plate 67 was not employed, there would be essentially no transference of heat from the hotter cells into the cooler cells and absorbed into the fluid passing therethrough because such heat from the panels 45 would be radiated outwardly of the absorber 20.

FIG. 12 depicts a proposed mounting for the collector 20, for example, on a roof top 100. If the collector is to be installed on a roof in Jacksonville, Fla., the collector should face due south as illustrated by arrow S with the sunlight being represented by arrows X passing through cover plate 67 and glass panels 45. If the roof angle is 10° with respect to the horizontal, the collector bottom must be elevated, adjacent upper side wall 23, an additional 21° with respect to the roof 100. Thus, with the tube means 52 extending horizontally, an extended solar pattern of radiation is provided across the absorber's surface between sunrise and sunset. The arcuate or generally parabolic shaping of the plates 55 with an elongated axis extending substantially horizontally, as well as the placement of the tube sections in an uneven array, provides increase thermal transmission of the energy and compenstes for seasonal variations. Furthermore the amount of copper plate is increased within each of the cells by curving the plates up the side walls 21 and 22 and the middle separators 38.

As may be seen from FIGS. 1 and 4, the fluid passage means 52 in the form of copper tubing 53 includes an absorber inlet section 110 extending through and sealed to end wall 24, inlet section 110 herein being shown bifuricated and connected to a pair of copper inlet conduits 111 and 112. Conduits 111 and 112 pass through each of the separators 34 and within the cell 46 adjacent the opposite end wall 25, bent or curved conduit sections 113 and 114 are provided to return fluid passing from the inlet conduits 111 and 112 through curved sections 113 and 114 back through the outlet conduits 115 and 116. When the outlet conduits 115 and 116 return to the cell 46 containing inlet section 110, the outlet conduits 115 and 116 pass through and are sealed to the separator 38 common to the adjacent cell 46 and thus become inlet conduits 117 and 118. Again conduits 117 and 118 have curved sections 119 and 120 communicating between inlet conduits 117 and 118 and respective return or outlet conduits 121 and 122 which are fluidly attached to absorber outlet section 123 which extends through and is sealed to end wall 24 of the absorber housing. An example of the spacing dimensions of the conduits as measured from lower side wall 22 towards upper side wall 23 are as follows:

| Conduit | Centimeters | Conduit | Centimeters |
|---|---|---|---|
| 111 | 9 | 117 | 49 |
| 112 | 20 | 118 | 60 |
| 116 | 30 | 122 | 70 |
| 115 | 36 | 121 | 76 | and the bent tube sections 113, 114, 119 and 120 and other portions of the tubing means 52 being approximately as shown. The hotter portions of the tubes, i.e. conduits 115, 116, 121 and 122 are accordingly located toward the upper portions of the respective cells 46 which are somewhat hotter than the lower portions thereof increasing the heat absorbed by such conduits from the metal plates 55. Of course, the hotter conduits 115, 116 and 121, 122 being fed back through the same cell containing the cooler inlet conduits 111, 112, and 117, 118 causes some of the heat within the hotter conduits to be reintroduced into the cell and absorbed by the liquid in the cooler conduits.

It is intended that a small pump be used to circulate the fluid through the absorber, the rate of flow preferably being approximately ½ gpm, an extremely slow rate compared to the fast pumping of the prior art flat box collectors. In tropical or temperate areas which have a good amount of sunlight, the absorber may be used without a pump, i.e. draining the absorber under the 30 pounds water pressure, which normally is present in the homes, through an outlet valve at the rate of about 0.4 gpm normally provides adequate heating of the water. It is understood that the collector in accord with this invention may be operated from about 0.01 gpm to no more than 1.5 gpm without departing from the spirit and scope of this invention.

Each of the cells are at differing temperatures and each cell acts as a series heater with respect to the fluid being passed therethrough, while simultaneously the hotter tube section has fed back some of its into the cell containing such hotter tube section and such heat is absorbed by the fluid within the cooler tube section in such cell.

The absorber in accord with this invention has developed water temperatures in the range of 150° F with a mean air temperature of 70° F, the inlet water temperature being 70° F. When the flow rate has been about 0.05 gpm, temperatures of the water from the absorber have been in excess of 180° F quite ample to operate solar air conditioning equipment.

In summary the present invention improves solar absorption with less use of circulating or pumping energy by reintroducing heat or providing feedback looping of hotter tubes into cells containing cooler tubes. The common absorber uses sinuous curving of tubes into various shapes within one dead air space and promotes overheating and internal collector heat losses by re-radiation outwardly of the collector. The normal technique to overcome these re-radiation heat losses within and through the common collector is by rapid pumping of a circulating liquid, with the energy requirements of circulation being quite large and wasteful. The present invention overcomes this problem by re-introducing hotter tubes into absorber cells with cooler tubes and thus permit re-absorption of the energy before it is re-radiated outwardly of the collector. Slower pumping rate in accord with this invention will result in higher overall efficiencies with less heat losses at higher operating temperatures necessary for operation for example, absorption ammonia and freon systems for air conditioning.

In accord with this invention efficiency is gained by relooping and feeding back heat to cooler areas of the absorber where the heat is again reabsorbed. The instant absorber is divided into individual dead air spaces or cells containing individual collection surfaces, thus dividing heat absorption into changing flow rates and absorption rates, the input to one cell never being the output of that cell. The cover glass panels also are segregated dividing expansion and cooling between a number of plates thereby preventing over heating or hot spots found on the large glass plates of the prior art.

In this invention to overcome hot spots, the glass plates are heat sinked by spreading the heat evenly across the glass surfaces. Therefore, less expensive glass can be used without glass breakage. Also each sectioned glass plate is set into expanding and contracting silicone rubber to accommodate rapid cooling and heating of the glass plates while the heat sink levels out the surface heating of the glass.

In the invention described herein, each absorbing panel has fluid heat conducting copper soldered tubes fed from a common parallel input, thus allowing high flow rates through the absorber with the high efficiency of small tubing. The smaller tubing will, of course, withstand the higher pressure requirements of solar air conditioning units and provides freeze protection if the unit system temperature control fails to operate to circulate fluid therethrough during freezes.

The instant absorber also has arcuate shaped solar collecting surfaces for a wider range of collection surface during the seasonal variations of the sun. The copper surface is parabolically shaped and concurrently the tubing is run in a fashion closer to the upper portions of the cell where convection heat will reheat the tubes. This is particularly important in areas of wide variation in solar paths. The higher and closer tubing runs allow for better absorption during winter months when less heat is available. Also the general horizontal design of the coils permits longer heating ranges; it is a horizontal tracking of the sun not vertical, as in most prior art collectors. Once the collector is positioned it requires no more positioning.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A solar heat absorber comprising a closed box frame having an open top and a transparent cover therefor, a plurality of heat collecting plates supported by said frame beneath said cover, fluid passage means attached to said plates for removing the heat collected by said plates, compartmental means within said box frame for forming a plurality of dead air spaces and for separating respective said plates between said frame and said cover, said fluid passage means including
   A. an inlet tube section communicating with a fluid inlet downwardly of one of said dead air spaces and passing through said one dead air spaces into another of said dead air spaces juxtaposed to said one dead air space,
   B. an outlet tube section passing from said juxtaposed dead air space into said one dead air space and communicating outwardly of said one dead air space, and
   C. a bent tube section coupling said inlet tube section and said outlet tube section in said juxtaposed dead air space whereby hotter fluid within said outlet tube section is reintroduced into said one dead air space for transference of some of the heat thereof into said one dead air space and thence into said cooler fluid within said inlet tube section therewithin before passing outwardly of said outlet tube section.

2. The solar heat absorber in accord with claim 1 wherein said cover comprises a plurality of transparent panels overlying respective said plates.

3. The solar heat absorber in accord with claim 2 further comprising means contacting each of said panels to provide a heat sink for said panels to substantially equalize the temperature thereof.

4. The solar heat absorber in accord with claim 2 further comprising a transparent cover panel spaced from and overlying all of said panels.

5. The solar heat absorber as defined in claim 1 wherein said dead air spaces are located in a generally horizontal row with the inlet to said absorber being located at an end space of said dead air spaces of the absorber with said juxtaposed dead air space containing said bent tube section constituting the opposite end dead air space of the absorber.

6. The solar heat absorber as defined in claim 1 wherein said dead air spaces are located in a pair of generally parallel and horizontal rows, said absorber having an inlet and an outlet extending through said frame and communicating inwardly thereof with said fluid passage means, said inlet being located at an end space of said dead air spaces in one said row of the absorber and said outlet being located at an end space of said dead air spaces in the other said row of the absorber.

7. The solar heat absorber as defined in claim 6 wherein each said end space of said dead air spaces in said one and another said rows are adjacent each other.

8. The solar absorber as defined in claim 1 wherein said dead air spaces are located in a pair of generally parallel and horizontal rows, said cover comprising a plurality of transparent panels overlying respective said plates.

9. The solar heat absorber as defined in claim 8 further comprising means extending between said rows and generally parallel to said rows and contacting each of said panels to provide a heat sink for said panels to substantially equalize the temperature thereof.

10. The solar heat absorber as defined in claim 9 wherein said latter means is located between said rows.

11. A solar heat collector comprising a closed box frame having an open top and a transparent cover therefor, a plurality of heat collecting metal plates supported by said frame beneath said cover, conduit means attached to each of said plates for the passage of fluid therethrough thereby removing the heat collected by said plates, separating means for separating respective said plates and forming a plurality of dead air spaces between said frame and said cover, said cover including a plurality of clear panels respectively forming the top of each dead air space, each said dead air space being at a temperature different than the temperature of an adjacent dead air space, means contacting each said panel to provide a heat sink for said panels to substantially equalize the temperature of said panels whereby hot spots, cold spots and differences in expansion and contraction are minimized.

12. The solar heat collector in accord with claim 11 wherein said conduit means includes a continuous conduit passing through said separating means and through each said dead air space.

13. The solar heat collector in accord with claim 12 wherein said collector is elongated and adapted to be positioned in a horizontal position, said plates being formed in an arcuate shape in the vertical direction.

14. The solar heat collector in accord with claim 11 wherein said fluid passage means includes
   A. an inlet tube section communicating with a fluid inlet outwardly of one of said dead air spaces and passing through said one dead air space into another of said dead air spaces adjacent to said one dead air space,
   B. an outlet tube section passing from said adjacent dead air space into said one dead air space and communicating outwardly of said dead air space, and
   C. a bent tube section coupling said inlet tube section and said outlet tube section in said adjacent dead air space to recirculate hotter fluid within said outlet tube section back into said one dead air space for transference of some of the heat thereof into said one dead air space and thence into said cooler fluid within said inlet tube section in said one dead air space.

15. The solar heat collector in accord with claim 11 wherein said dead air spaces are located in a pair of generally parallel and horizontal rows.

16. The solar heat collector in accord with claim 15 wherein said means contacting each said panel extends generally parallel to said rows.

17. The solar heat collector in accord with claim 16 wherein said means contacting each said panel is located between said rows and carried by said frame.

18. The solar heat collector in accord with claim 16 wherein said means contacting each said panel is located between said rows and is supported by said separating means.

19. The solar heat collector in accord with claim 16 wherein said means contacting each said panel is in the form of an I-beam with oppositely disposed channels receiving edge portions of said panels from respective rows of panels.

20. A solar heat collector comprising an enclosure and a transparent cover therefor, separating means for dividing said enclosure into a plurality of cells, a plurality of heat collecting plates respectively within said cells, fluid passage means passing through said separating means and attached to said plates for removing the heat collected by said plates, said fluid passage means including
   A. an outlet tube section communicating with a fluid inlet outwardly of one of said cells and passing through said one cell into another of said cells juxtaposed to said one cell,
   B. an outlet tube section passing from said juxtaposed cell into said cell and communicating outwardly of said cell, and
   C. a bent tube section coupling said inlet tube section and said outlet tube section in said juxtaposed cell to recirculate hotter fluid within said outlet tube section back into said one cell for transference of some of the heat thereof into said one cell and thence into said cooler fluid within said inlet tube section in said one cell.

21. The solar heat collector in accord with claim 20 wherein said cover comprises a plurality of transparent panels overlying respective said plates.

22. The solar heat collector in accord with claim 21 further comprising means contacting each of said panels to provide a heat sink for said panels to substantially equalize the temperature thereof.

23. The solar heat collector in accord with claim 21 wherein each said cell is at a temperature different than the temperature of an adjacent cell, means contacting each said panel to provide a heat sink for said panels to substantially equalize the temperature of said panels whereby hot spots, cold spots and differences in expansion and contraction are minimized.

24. The solar heat collector in accord with claim 20 further comprising a transparent cover panel spaced from and overlying all of said panels.

25. The solar heat collector in accord with claim 20 wherein said fluid passage means includes a continuous conduit passing through said separating means and through each said cell.

26. The solar heat collector in accord with claim 24 wherein said collector is elongated and adapted to be positioned in a horizontal position, said plates being formed in an arcuate shape in the vertical direction.

27. The solar heat collector as defined in claim 20 wherein said cells are located in a generally horizontal row with the inlet to said collector being located at an end cell of said cells of the collector with said juxtaposed cell containing said bent tube section constituting the opposite end cell of the collector.

28. The solar heat collector as defined in claim 20 wherein said cells are located in a pair of generally parallel and horizontal rows, said collector having an inlet and an outlet extending through said frame and communicating inwardly thereof with said fluid passage means, said inlet being located at an end cell of said cells in one said row of the collector and said outlet being located at an end cell of said cells in the other said row of the collector.

29. The solar heat collector as defined in claim 28 wherein each said end cell of said cells in said one and another said rows are adjacently disposed.

30. The solar heat collector as defined in claim 20 wherein said cells are located in a pair of generally parallel and horizontal rows, said cover comprising a plurality of transparent panels overlying respective said plates, and means extending between said rows and generally parallel to said rows and contacting each of said panels to provide a heat sink for said panels to substantially equalize the temperature thereof.

* * * * *